United States Patent [19]

De Maagd

[11] Patent Number: 5,577,301
[45] Date of Patent: Nov. 26, 1996

[54] RETAINER AND LOCKING CLIP FOR ATTACHING AN ACCESSORY TO A VEHICLE

[75] Inventor: Donald N. De Maagd, Grandville, Mich.

[73] Assignee: Prince Corporation, Holland, Mich.

[21] Appl. No.: 461,882

[22] Filed: Jun. 5, 1995

[51] Int. Cl.⁶ .................................................. A44B 21/00
[52] U.S. Cl. .................... 24/295; 24/289; 24/293; 24/297; 411/174; 411/175; 411/522; 411/112; 411/113
[58] Field of Search .......................... 24/289, 293, 295, 24/297; 411/174, 175, 522, 112, 113

[56] References Cited

U.S. PATENT DOCUMENTS

| | | | |
|---|---|---|---|
| 351,425 | 10/1886 | Coleman | 411/522 X |
| 2,278,290 | 4/1942 | Langmaid | 411/112 |
| 2,281,700 | 5/1942 | Langmaid | 411/113 |
| 2,516,274 | 7/1950 | Tinnerman | 411/112 |
| 2,672,905 | 3/1954 | Hartman et al. | 411/175 |
| 2,709,390 | 5/1955 | Smith . | |
| 3,125,316 | 3/1964 | Wilmhoff . | |
| 3,182,367 | 5/1965 | Hamann et al. | 411/522 |
| 3,259,006 | 7/1966 | Dukatz et al. . | |
| 3,367,082 | 2/1968 | Meyer . | |
| 3,403,881 | 10/1968 | Bennett et al. . | |
| 3,459,096 | 8/1969 | Parkin . | |
| 3,478,801 | 11/1969 | Van Niel | 411/112 |
| 3,491,820 | 1/1970 | Ostling . | |
| 3,508,371 | 4/1970 | Meyer | 24/295 |
| 3,636,593 | 1/1972 | Buttriss et al. . | |
| 4,141,108 | 2/1979 | Busse . | |
| 4,458,872 | 7/1984 | Couch . | |
| 4,643,610 | 2/1987 | Bien | 411/175 X |
| 4,698,882 | 10/1987 | Lang . | |
| 4,729,706 | 3/1988 | Peterson et al. | 411/175 |
| 4,860,409 | 8/1989 | Bering et al. . | |
| 4,875,816 | 10/1989 | Peterson | 411/112 X |
| 4,948,085 | 8/1990 | Mittelhäuser . | |
| 4,981,322 | 1/1991 | Dowd et al. . | |
| 4,981,323 | 1/1991 | Dowd et al. . | |
| 5,111,557 | 5/1992 | Baum et al. . | |
| 5,285,551 | 2/1994 | Weiland et al. . | |
| 5,414,903 | 5/1995 | Porteous | 24/9 |
| 5,423,646 | 6/1995 | Gagnon | 411/174 X |

FOREIGN PATENT DOCUMENTS

| | | | |
|---|---|---|---|
| 326481 | 8/1989 | France | 411/175 |
| 391764 | 10/1990 | France | 411/175 |

*Primary Examiner*—Peter M. Cuomo
*Assistant Examiner*—Stephen Vu
*Attorney, Agent, or Firm*—Price, Heneveld, Cooper, DeWitt & Litton

[57] ABSTRACT

A clip fastener includes a retainer member having a spring clip cooperating with a post projecting from the underlying sheet metal of the vehicle such that the retainer can be slid over the post and locked into position by the clip. An accessory, such as a grab handle, is attached to the retainer using a conventional fastener. The retainer preferably includes a tapered slot for allowing the fastener to slide into locking engagement with the mounting post.

17 Claims, 1 Drawing Sheet

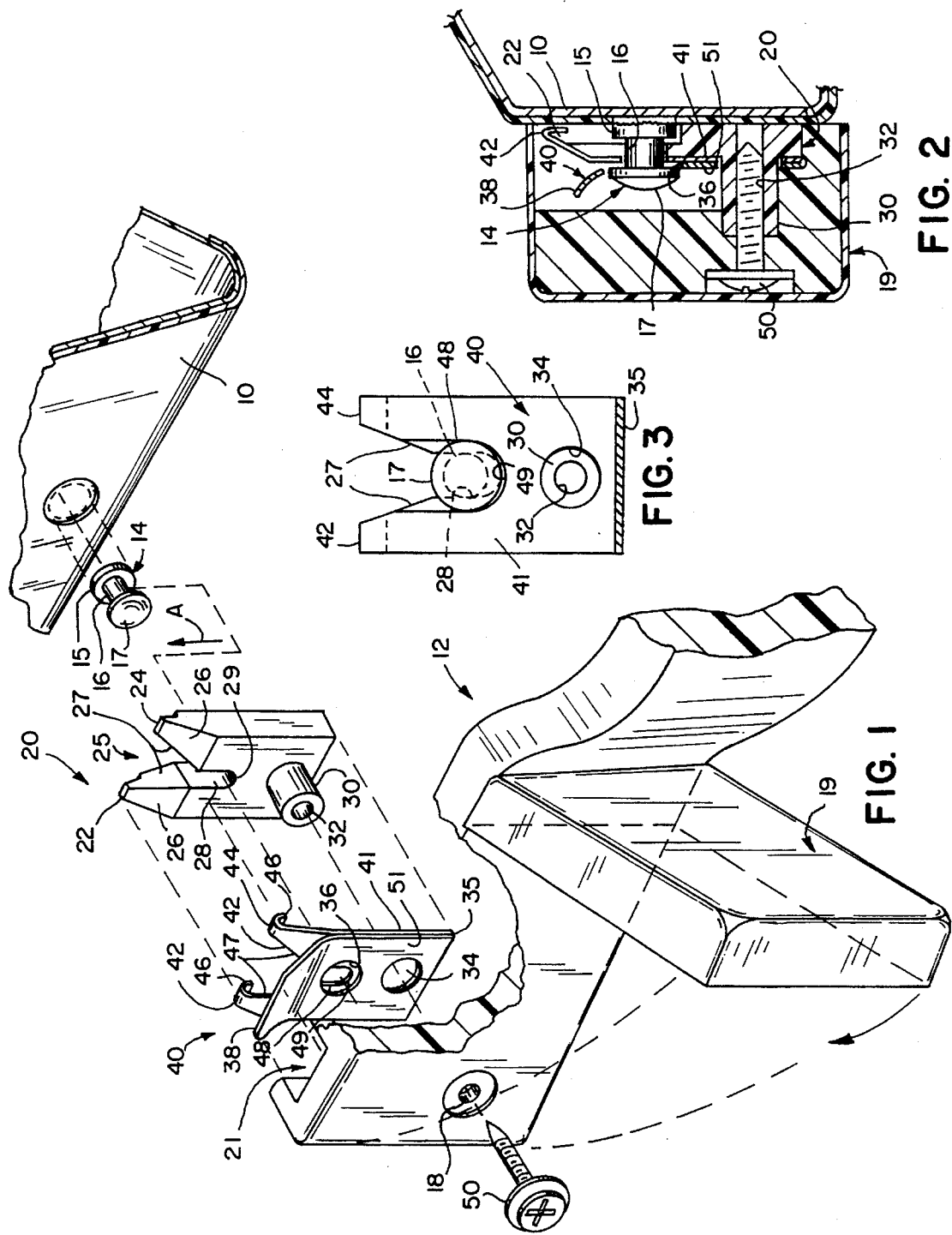

RETAINER AND LOCKING CLIP FOR ATTACHING AN ACCESSORY TO A VEHICLE

BACKGROUND OF THE INVENTION

The present invention relates to a fastener for use in attaching a vehicle accessory to a vehicle.

In the past, vehicle accessories, such as assist straps, armrests, consoles and the like, have been mounted to the underlying sheet metal roof of the vehicle utilizing threaded fasteners, such as screws, which typically are enclosed by a decorative cover once installed. More recently, snap-in, spring-type fasteners have been employed as disclosed, for example, in U.S. Pat. No. 5,285,551. This patent discloses utilization of a unique strap and attachment system utilizing a threaded fastener and spring clip such that the assist strap can be snap-fitted into an installed position.

Although both threaded fasteners and spring-clip fasteners have been successfully employed in the automotive environment for utilization in attaching assist straps and other vehicle accessories to a vehicle, their removal for servicing requires the removal of the threaded fastener. Their installation requires a two-step process of securing the clip to the assist strap utilizing the threaded fastener and subsequently forcing the spring clip into the underlying sheet metal structure to lock it in place. There remains a need, therefore, for a fastening system for vehicle accessories in which a fastener can be relatively easily installed in a vehicle and removed without the need for applying an impact force to the device during installation and allowing removal of the accessory for servicing without the need for removing a threaded fastener.

SUMMARY OF THE PRESENT INVENTION

The fastening system of the present invention provides an improved system by which an accessory, such as a vehicle assist strap, can be secured to a vehicle. This is accomplished in the preferred embodiment of the invention by the utilization of a retainer member having a spring clip with the retainer member cooperating with a post projecting from the underlying sheet metal of the vehicle roof such that the retainer can be slid over the post and locked into position by the clip. An accessory, such as a grab handle, is attached to the retainer using a conventional fastener, such as a screw which can remain in place, attached to the retainer. The spring clip selectively locks the retainer to the post and includes a movable locking member which can be deflected for subsequent removal of the vehicle accessory from the attachment post without removal of the threaded fastener.

Such an installation provides for easy preassemble of the accessory and fastening structure and allows installation during manufacture of the vehicle by sliding the retainer with respect to the mounting post into a locked position. Removal for servicing involves deflecting of the locking member of the retaining clip and sliding it in a direction opposite of that for installation of the accessory. These and other features, objects and advantages of the present invention will become apparent upon reading the following description thereof together with reference to the accompanying drawings.

BRIEF DESCRIPTION OF THE DRAWINGS

FIG. 1 is an exploded, perspective view of a vehicle accessory embodying the fastening system of the present invention;

FIG. 2 is a vertical cross-sectional view of the fastener of FIG. 1 shown in an assembled position; and FIG. 3 is a fragmentary, front elevational view partly in cross section of the fastener system of the present invention.

DETAILED DESCRIPTION OF THE PREFERRED EMBODIMENT

Referring initially to FIG. 1, there is shown the underlying sheet metal support member 10 for a vehicle, such as an automobile. Member 10 may be located in the roof area above a window in a position for the mounting of an assist strap 12 to the vehicle to facilitate ingress and egress therefrom. Mounted to surface 11 of underlying sheet metal support 10 is a mounting post 14 having a generally disk-shaped base 15, a narrowed cylindrical section 16 and a disk-shaped head 17 all integrally formed of a suitable metal with the bottom surface of base 15 welded to the surface 11 of the sheet metal support 10, as seen in FIG. 2. The vehicle includes a headliner which covers the sheet metal support 10 and which includes a suitable opening exposing the post for mounting of the assist strap thereto utilizing the fastener system of the present invention.

The fastener system includes a retainer 20 made of a suitable polymeric material, such as polycarbonate, acetal, ABS or the like. The retainer includes a bifurcated upper end having a pair of tines 22, 24 defining a tapered slot 25 therebetween. Each of the tines 22, 24 include a tapered front surface 26 and an inwardly tapered inside surface 27 such that slot 25 is inwardly convergent and assists in guiding the retainer in sliding over the post 14, as described below. The slot 25 communicates with an elongated notch 28 in the body of retainer 20 which terminates in a semi-cylindrical surface 29. The retainer body also includes a cylindrical projection 30 having an opening 32 for receiving a threaded self-tapping fastener screw 50.

Mounted to the retainer is a spring clip 40 made of a suitable spring steel member and having a first wall 41 with a bifurcated end generally conforming to that of the bifurcated end of retainer 20. Thus, clip 40 includes first and second tines 42, 44, each having inwardly converging, tapered edges 47 terminating in an elongated slot 48 with a cylindrical end 49 conforming to the notch 28 and end 29 of retainer 20. The ends of tines 42, 44 also include U-shaped, downwardly depending hooks 46 which extend over the ends of tines 22, 24 as best seen in FIG. 2 for mounting the clip to the retainer in cooperation with an aperture 34 which extends through walls 41 and adjacent wall 51 of clip 40 and which has a diameter to allow the clip to fit over cylindrical projection 30 of retainer 20 for locking the clip to the retainer as seen in FIGS. 2 and 3.

The front and rear walls of the clip 40 are integrally formed and joined at end 35 with aperture 34 formed through both walls 41 and 51. Wall 51 includes a second aperture 36 which is aligned with the end of slot 48 and has the diameter selected to allow the disk-shaped head 17 of post 14 to extend therethrough as seen in FIG. 2. Wall 51 of clip 40 serves as a deflectable locking member and for such purpose includes an outwardly inclined end 38 which can be used as a handle for deflecting the wall 51 at hinge point 35 in relation to wall 41, which is fixedly attached to the retainer by the cooperation of hooks 46 over the ends of the bifurcated tines of the retainer and the aperture 34 over projection 30.

The clip is thus mounted to the retainer by placing the hooks 46 over the ends of tines 22, 24 and pushing the retainer down until aperture 34 clears projection 30 and thereby attaches the clip to the retainer. In this position, aperture 36 aligns with notch 28 of the retainer. The grab handle 12 is then mounted to the subassembly utilizing fastener 50 which extends through a recessed aperture 18 in the end of grab handle 12 which may include a decorative cover flap 19 which snaps over the end of the grab handle to provide a finished appearance once installed. Fastener 50 extends through aperture 18 in the end of grab handle 12 and into aperture 32 of the retainer. As seen in FIG. 2, the projection 30 extends beyond the wall 51 of clip 40 to receive the end of grab handle 12.

Once the end of grab handle 12 is preassembled to the retainer, it can then be slid over the end of post 14 with the head 17 of post 14 projecting through notch 28 and corresponding notch 48 in the bifurcated ends of the retainer and clip, respectively, and the assembly moved upwardly in the direction indicated by Arrow A in FIG. 1 until the head 17 of post 14 deflects the inner surface 38 of clip 40 during installation until it aligns with aperture 36. When this occurs, the deflectable wall 51, which is previously outwardly bent by the head 17 of post 14, snaps into a locking position, as shown in FIG. 2, thereby locking the assist strap end to the underlying sheet metal support 10 of the vehicle. The post 14 is of a length such that the edge of head 17 aligns with the edge of aperture 36 in the locking member comprising deflectable wall or leg 51 of clip 40 to lock the assembly in place. The opposite end of the assist strap includes an identical mounting structure. The clip 40 is made of a suitable spring steel material surface treated for use in the automotive environment in a conventional manner.

For removal of the assist strap should removal become necessary, the cover flap 19 is opened to expose the tip 38 of clip 40 through slot 21 in the end of the assist strap 12. The deflectable wall 51 is sprung outwardly away from the vehicle until the aperture 36 clears the head 17 of post 14. The assembly is then moved in a direction opposite arrow A to disengage the post 14 allowing removal of the end of the assist strap. The other end of the assist strap can similarly be removed.

Thus, the fastener system of the present invention provides a system in which the fastener can be preinstalled to a vehicle accessory, such as an assist strap, armrest, console or other accessory, to be installed to the underlying sheet metal structure of a vehicle and allow the subassembly to be installed by easily aligning the bifurcated ends of the fastener with a mounting post and sliding the subassembly into a locked position.

In some embodiments, clip 40 can be integrally formed with the retainer 20. Also, post 14 could be threadably secured to the sheet metal 10. It will become apparent to those skilled in the art that these and various modifications to the preferred embodiment of the invention as described herein can be made without departing from the spirit or scope of the invention as defined by the appended claims.

The embodiments of the invention in which an exclusive property or privilege is claimed are defined as follows:

1. An accessory and a removable clip fastener apparatus for attaching said accessory to a vehicle comprising:

a vehicle interior accessory to be mounted to a vehicle support;

a retainer including a bifurcated end including a pair of tapered tines leading to a notch, said retainer including an aperture for receiving a fastening screw for attachment of said retainer to said accessory; and a locking clip mounted to said retainer and including a deflectable locking member having an aperture therein aligned with said notch of said retainer such that said retainer and clip can be slid over a mounting post associated with a vehicle support such that the mounting post is engaged in said bifurcated end terminating in said notch and is captively held within said aperture in said clip to attach said accessory to the vehicle support.

2. The apparatus as defined by claim 1 wherein said clip comprises a spring clip having a pair of legs, wherein one of said legs has a bifurcated end conforming to that of said retainer such that said bifurcated end of said clip fits over said bifurcated end of said retainer.

3. The apparatus as defined by claim 2 wherein said clip includes an aperture extending therethrough and aligned with said aperture of said retainer for receiving a fastener screw for attaching an accessory to said retainer.

4. The apparatus as defined by claim 3 wherein said clip includes a deflectable leg having an inclined end forming a handle for the deflection of said leg to release said leg from locking engagement with a mounting post.

5. The apparatus as defined by claim 4 wherein said retainer is made of a polymeric material.

6. The apparatus as defined by claim 5 wherein said retainer includes a projection into which said aperture is formed.

7. The apparatus as defined by claim 6 and further including a mounting post having a head and a narrow cylindrical body.

8. A clip fastener for attaching accessories to a vehicle comprising:

a retainer including a tapered slot terminating in a notch, said retainer also including a projection having an aperture for receiving a threaded fastener; and a deflectable locking member having an aperture therein aligned with said slot of said retainer such that said retainer and locking member can be slid over a mounting post deflecting said locking member until said aperture in said locking member aligns with the post and snaps over the post to captively hold the post in said notch, wherein said locking member comprises a spring clip having a pair of legs, wherein one of said legs has a bifurcated end conforming to said slot of said retainer, said bifurcated end including hooks which fit over said retainer, and wherein said clip includes an aperture extending through said pair of legs and aligned with said aperture of said retainer for receiving said projection and threaded fastener for attaching an accessory to said retainer.

9. The clip fastener defined by claim 8 wherein the other of said pair of legs has an inclined end forming a handle for the deflection of said other leg to release said other leg from locking engagement with a mounting post.

10. The clip fastener defined by claim 9 wherein said retainer is made of a polymeric material.

11. The clip fastener defined by claim 10 wherein said retainer includes a projection into which said aperture is formed.

12. The clip fastener defined by claim 11 and further including a mounting post having a head and a narrow cylindrical body.

13. A removable clip fastener for attaching accessories to a vehicle comprising:

a polymeric retainer including a bifurcated end defined by a pair of tapered tines defining a tapered slot communicating with a notch having a semi-cylindrical edge, said tines further including tapered front surfaces extending from said notch to said bifurcated end, said retainer further including a cylindrical projection spaced from said notch and having an aperture for receiving a fastening screw;

a mounting post for attachment to a vehicle support member, said post having an enlarged head spaced from a vehicle support member and a cylindrical body behind said head; and a locking member positioned over said retainer and including a deflectable leg having a first aperture therein aligned with said notch of said retainer such that said retainer can be slid over a mounting post such that said mounting post is engaged in said bifurcated end terminating in said slot and said head is captively held by said aperture in said locking member, said locking member including a second aperture for receiving said cylindrical projection of said retainer.

14. The removable clip fastener defined by claim 13 wherein said locking member comprises a spring clip having a pair of legs, wherein one of said legs has a bifurcated end conforming to that of said retainer such that said bifurcated end of said clip fits over said bifurcated end of said retainer.

15. The removable clip fastener defined by claim 14 wherein said clip includes an aperture extending through said pair of legs and aligned with said aperture of said retainer for receiving a fastener screw for attaching an accessory to said retainer.

16. The removable clip fastener defined by claim 15 wherein the other of said pair of legs has an inclined end forming a handle for the deflection of said other leg to release said other leg from locking engagement with said head of said mounting post.

17. The removable clip fastener defined by claim 16 wherein said locking member is made of a spring steel material.

* * * * *